United States Patent
Aktas et al.

(10) Patent No.: US 11,180,177 B1
(45) Date of Patent: Nov. 23, 2021

(54) TILTABLE STEERING WHEEL MECHANISM HAVING DRIVING AND UTILITY POSITIONS

(71) Applicant: Ford Global Technologies, LLC, Dearborn, MI (US)

(72) Inventors: Macit Aktas, Windsor (CA); Joseph Michael Kish, Canton, MI (US); Martin Fassbender, Buschhoven (DE); Philipp Kuepper, Grevenbroich (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/159,283

(22) Filed: Jan. 27, 2021

(51) Int. Cl.
*B62D 1/06* (2006.01)
*B62D 1/08* (2006.01)

(52) U.S. Cl.
CPC .............. *B62D 1/06* (2013.01); *B62D 1/08* (2013.01)

(58) Field of Classification Search
CPC ... B62D 1/04; B62D 1/06; B62D 1/10; B62D 1/18; B62D 1/183; B62D 1/187; G05G 1/08; G05G 1/10
See application file for complete search history.

(56) References Cited

U.S. PATENT DOCUMENTS

| | | | |
|---|---|---|---|
| 2,299,025 A | 10/1942 | McGinley | |
| 2,326,131 A | 8/1943 | Eschelbacher | |
| 2,845,810 A | 8/1958 | Sampson | |
| 3,691,866 A | 9/1972 | Berkes | |
| 5,088,342 A | 2/1992 | Bening et al. | |
| 6,279,414 B1 | 8/2001 | Moon | |
| 10,501,108 B2 | 12/2019 | Beauregard | |
| 10,562,558 B1 | 2/2020 | Spahn et al. | |
| 2007/0295151 A1* | 12/2007 | Kentor | B62D 1/06 74/552 |
| 2018/0037248 A1* | 2/2018 | Schwarz | B60W 60/0051 |
| 2018/0154921 A1 | 6/2018 | Bonello et al. | |
| 2020/0198684 A1* | 6/2020 | Murray | B62D 1/06 |

FOREIGN PATENT DOCUMENTS

WO    2003020571 A1    3/2003

* cited by examiner

*Primary Examiner* — Richard W Ridley
*Assistant Examiner* — Brian J McGovern
(74) *Attorney, Agent, or Firm* — David L. Coppiellie; Price Heneveld LLP

(57) ABSTRACT

A steering wheel assembly includes a rim that is movably connected to a base for movement between driving and utility positions. A movement control mechanism is configured to selectively lock the rim in the driving position relative to the base structure. The motion control mechanism includes a detent that is configured to retain the rim structure in the utility position relative to the base structure, whereby a user can apply a force to the rim structure to overcome the detent and move the rim structure from the utility position to the driving position.

18 Claims, 8 Drawing Sheets

TILTABLE STEERING WHEEL MECHANISM HAVING DRIVING AND UTILITY POSITIONS

FIELD OF THE DISCLOSURE

The present invention generally relates to a steering wheel for vehicles, and specifically to a steering wheel that can be retained in a utility position by a detent.

BACKGROUND OF THE DISCLOSURE

Known steering wheels for motor vehicles and the like may include tilting and telescoping adjustment capabilities to adjust the position of the steering wheel to accommodate the preferences and needs of drivers while operating the motor vehicle. Known steering wheels may also move to facilitate user ingress and egress.

SUMMARY OF THE DISCLOSURE

One aspect of the present disclosure is a steering wheel assembly for a vehicle. The steering wheel assembly includes a base structure that is pivotable about a first axis to provide a steering input. The steering wheel assembly also includes a rim structure that is rotatably connected to the base structure to permit rotation of the rim structure relative to the base structure about a second axis that is transverse to the first axis, whereby the rim structure can be rotated relative to the base structure about the second axis between a driving position and a utility position. The rim structure and the base structure are configured to rotate together about the first axis when the rim structure is in a driving position to provide steering input command or control. The rim structure rotates in a first direction about the second axis relative to the base structure when moving from the driving position to the utility position, and the rim structure rotates in a second direction about the second axis relative to the base structure when moving from the utility position to the driving position. The steering wheel assembly further includes a powered lock that is configured to lock the rim structure in the driving position relative to the base structure when the lock is in a locked configuration. The powered lock shifts to an unlocked configuration permitting rotation of the rim structure relative to the base structure about the second axis when the powered lock is actuated. A detent mechanism is configured to retain the rim structure in the utility position relative to the base structure. The detent mechanism is configured to release and permit rotation of the rim structure relative to the base structure about the second axis when a user applies a force to the rim structure sufficient to overcome a predefined retaining force of the detent mechanism.

Embodiments of the first aspect of the present disclosure can include any one or a combination of the following features:

- The rim structure may optionally form a loop defining a plane, and the plane of the rim structure may optionally be substantially horizontal when the rim structure is in the utility position;
- the utility position may optionally comprise a first utility position, and the detent mechanism may optionally be configured to retain the rim structure in a second utility position between the first utility position and the driving position;
- the detent mechanism may optionally be configured to provide a plurality of intermediate utility positions between the first utility position and the driving position;
- the rim structure may optionally include a lock sector having a lock surface and a detent surface;
- the steering wheel assembly may optionally include a cam that is configured to selectively engage the lock surface when the rim structure is in the driving position to prevent movement of the rim structure relative to the base structure in at least the first direction;
- the cam may optionally be configured to selectively engage the detent surface when the rim structure is in the utility position to provide the predefined retaining force;
- the cam may optionally be rotatably mounted to the base structure;
- the steering wheel assembly may optionally include a powered actuator that is configured to selectively rotate the cam from a locked position in which the cam engages the lock surface to an unlocked position in which the cam is disengaged from the lock surface to permit rotation of the rim structure relative to the base structure;
- the steering wheel assembly may optionally include a spring that rotatably biases the cam into engagement with the lock sector;
- the lock sector may optionally include a first stop surface that is configured to engage a second stop surface of the base structure when the rim structure is in the driving position to thereby prevent rotation of the rim structure in the second direction beyond the driving position;
- the cam may optionally include a cam surface that is configured to engage the lock surface of the lock sector when the cam is in the locked position and the rim structure is in the driving position to thereby generate a force tending to rotate the rim structure in the second direction;
- a first stop surface of the lock sector may optionally be configured to simultaneously engage the second lock surface when the rim structure is in the driving position to prevent rotation of the rim structure in the second direction;
- the cam surface may optionally be configured to slidably engage the detent surface of the lock sector when the rim structure is in the utility position, and engagement of the cam surface and the detent surface may optionally result in a force on the cam tending to disengage the cam surface from the detent surface when a force is applied to the rim structure to rotate the rim structure about the second axis relative to the base structure;
- the lock sector may optionally include a notch having first and second opposed detent surfaces, and the cam surface may optionally comprise a protrusion that is received in the notch to provide the predefined retaining force when the rim structure is in the utility position;
- the protrusion may optionally slide along the first detent surface when a force is applied to the rim structure to rotate the rim structure in the first direction, and the protrusion may optionally slide along the second detent surface when a force is applied to the rim structure to rotate the rim structure in the second direction;
- the lock sector may optionally include a third lock surface that is configured to engage the base structure when the rim structure is in the utility position to thereby prevent rotation of the rim structure in the first direction beyond (past) the utility position, and the protrusion of the cam may optionally simultaneously engage the first detent surface while the third lock surface engages the base structure;

the rim structure may optionally comprise a ring configured to be grasped by a user, and the rim structure may optionally further include first and second bridging structures extending between the ring and the base structure;

the bridging structures optionally include first and second lock sectors, each having a first stop surface and a notch having first and second opposed detent surfaces;

the steering wheel assembly may optionally include first and second cams that are rotatably biased into engagement with the first and second lock sectors, respectively, by first and second springs, respectively;

the steering wheel assembly may optionally include a user input feature that is configured to permit a user to generate an unlock request whereby a controller unlocks the powered lock in response to an unlock request unless predefined "deny unlock" criteria are satisfied; and the predefined "deny unlock" criteria may include at least one of the vehicle being park or in an autonomous control mode.

Another (second) aspect of the present disclosure is a steering wheel assembly for a vehicle. The steering wheel assembly may include a rim structure that is movably connected to a base structure for movement between a driving position and a utility position. The steering wheel assembly may include a movement control mechanism that is configured to selectively lock the rim structure in the driving position relative to the base structure when the movement control mechanism is locked, whereby the rim structure cannot be moved relative to the base structure when the motion control mechanism is locked. The motion control mechanism may include a detent that is configured to retain the rim structure in the utility position relative the base structure, whereby a user can apply a force to the rim structure to overcome the detent and move the rim structure from the utility position to the driving position.

Embodiments of the second aspect of the present disclosure can include any one or a combination of the following features:

The motion control mechanism may optionally include a powered actuator that unlocks the motion control mechanism when actuated to thereby permit movement of the rim structure relative to the base structure;

the motion control mechanism may optionally include a lock sector having a lock surface and a detent surface, and a cam that is configured to selectively engage the lock surface to prevent movement of the rim structure in a first direction relative to the base structure;

the cam may optionally be configured to engage the detent surface when the rim structure is in the utility position to retain the rim structure in the utility position to provide a predefined retaining force that can be overcome by applying a force to the rim structure, without actuating the powered actuator;

the lock sector may optionally be fixed to the rim structure and move with the rim structure. The detent surface may optionally comprise a notch in the lock sector; and the cam may optionally be rotatably mounted to the base structure and may optionally include a protrusion that is biased into engagement with the notch of the lock sector.

Another aspect of the present disclosure is a method of shifting a steering wheel rim structure relative to a base structure between a driving position in which the rim structure can be rotated to provide a steering input, and a utility position in which the rim structure is substantially horizontal to support objects thereon. The method includes unlocking a motion control mechanism when the rim structure is in the driving position to permit movement of the rim structure relative to the base structure. The method further includes moving the rim structure from the driving position to the utility position, and causing the rim structure to be retained in the utility position by a detent mechanism. The method further includes manually applying a force to the rim structure to overcome a retaining force of the detent mechanism, manually moving the rim structure from the utility position to the driving position, and causing the motion control mechanism to lock the rim structure in the driving position relative to the base structure.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a device is described as containing components A, B, and/or C, the device can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having one component, two components, or more than two such components unless the context clearly indicates otherwise.

Figure 1:
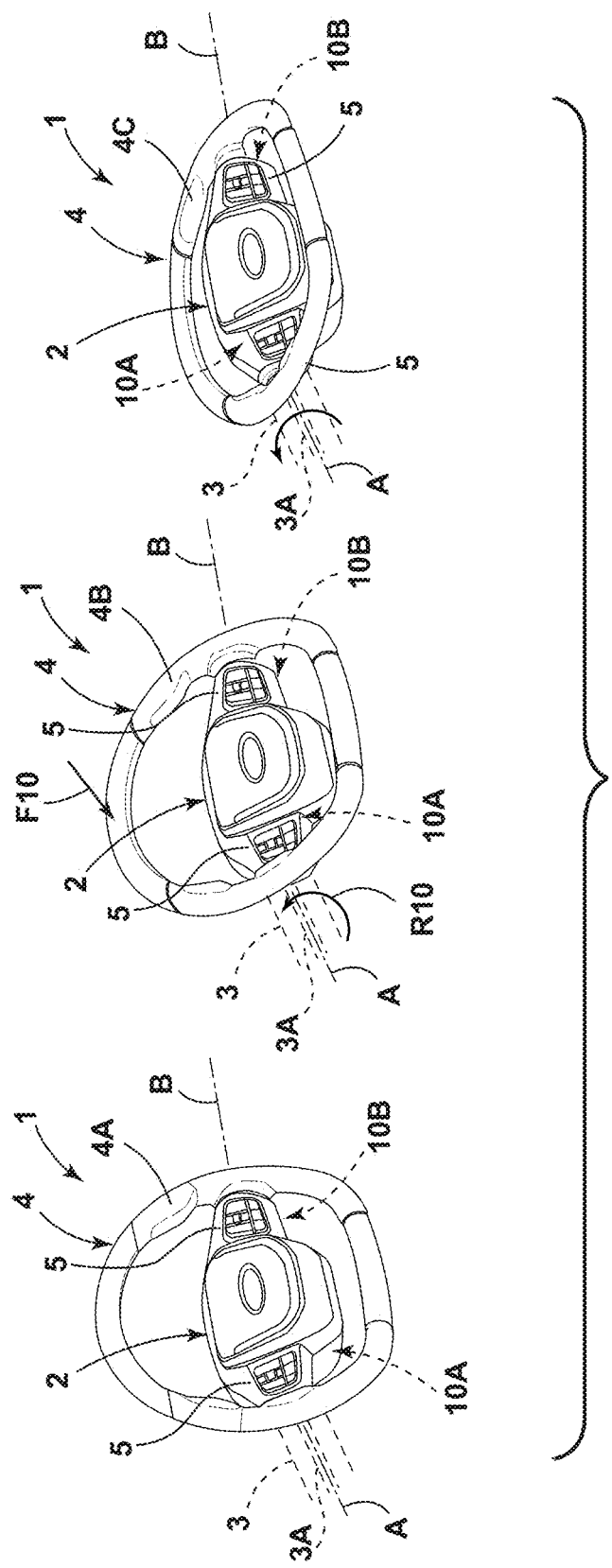
FIG. 1 is a partially fragmentary perspective view showing a steering wheel assembly according to the present disclosure in a use (driving) configuration and first and second utility configurations.

With reference to FIG. 1, a steering wheel assembly 1 according to one aspect of the present disclosure includes a base structure 2 and a rim structure 4. Base structure 2 may be operably connected to a steering column 3 of a motor vehicle to provide steering inputs. In particular, base structure 2 may be pivotable about a first axis "A" to provide a steering input when a user grasps and rotates the rim structure 4. Steering column 3 may include a mechanical link 3A that rotates with base structure 2 to provide a mechanical steering input. Alternatively, the steering wheel assembly 1 may include sensors (not shown) that provide an electronic signal corresponding to an angular position of the steering wheel to thereby provide a "steer by wire" steering system. Rim structure 4 may comprise a loop or ring, or virtually any other suitable structure. According to one non-limiting example, rim structure 4 comprises a loop defining a plane. The steering wheel assembly 1 may include first and second bridging structures 5 that interconnect the base structure 2 and the rim structure 4.

The steering wheel assembly 1 may include one or more motion control devices or mechanisms 10A, 10B (powered locks) that permit movement of rim structure 4 from a driving position 4A to an intermediate utility position 4B, and a table top utility position 4C. In general, the steering wheel assembly 1 may be configured to provide a single intermediate utility position (e.g., utility position 4C), or the steering wheel assembly 1 may be configured to provide a plurality of intermediate utility positions 4B, 4C, etc. As discussed in more detail below, motion control mechanisms 10A, 10B may be configured to lock the rim structure 4 in driving position 4A relative to base structure 2 when a vehicle is being driven. The motion control mechanisms 10A, 10B may also be configured to retain the rim structure 4 via a detent when the rim structure 4 is in a utility position 4B, 4C, etc. relative to base structure 2. The rim structure 4 may be configured to pivot about a second axis "B" that is transverse to first axis "A" between the driving position 4A and one or more utility positions 4B, 4C, etc. When the motion control mechanisms 10A, 10B are locked, a user cannot rotate rim structure 4 about second axis "B" to shift the rim structure 4 from the driving position 4A to a utility position 4B, 4C, etc. However, the detent feature of motion control mechanisms 10A, 10B provides a predefined resistance force that can be overcome by manually applying a force to the rim structure 4 to thereby rotate the rim structure 4 from a utility position 4B, 4C back to the driving position 4A.

Figure 2:
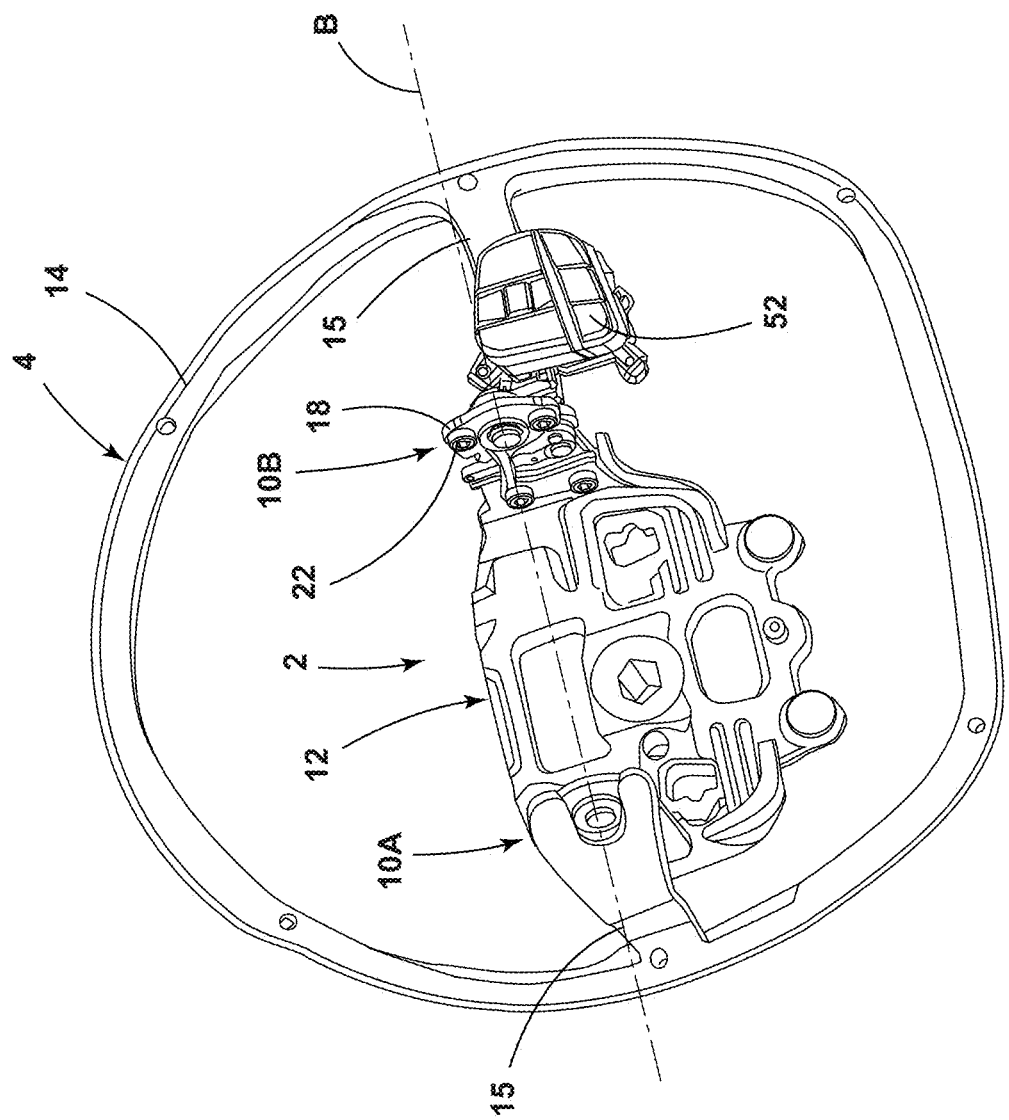
FIG. 2 is a partially fragmentary perspective view of the inner structure of steering wheel assembly of FIG. 1.

With further reference to FIG. 2, base structure 2 may include an internal structure such as a bracket 12 that is connected to motion control mechanisms 10A, 10B. Rim structure 4 may include an internal structure 14 including internal bridge structures 15 that interconnect internal structure 14 to motion control mechanisms 10A, 10B.

Figure 4:
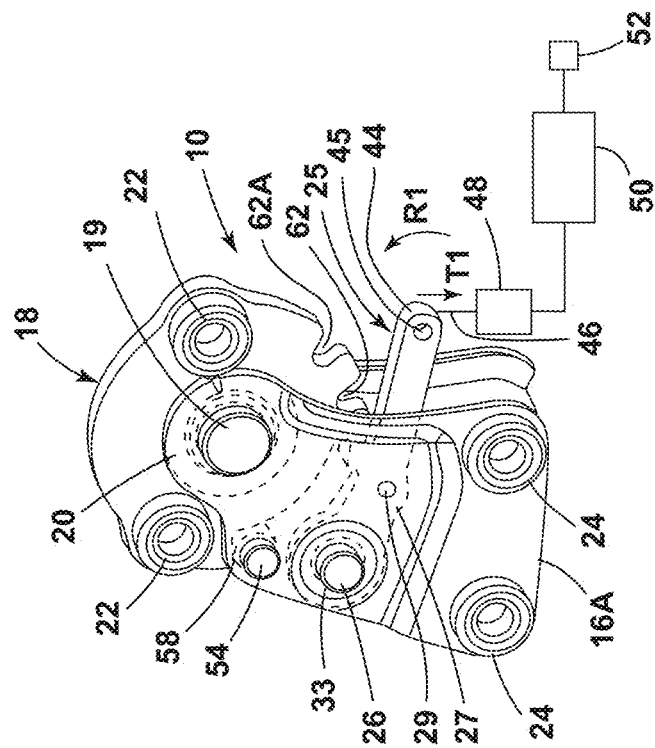
FIG. 4 is a perspective view of a second side of the motion control mechanism of FIG. 3.
Figure 3:
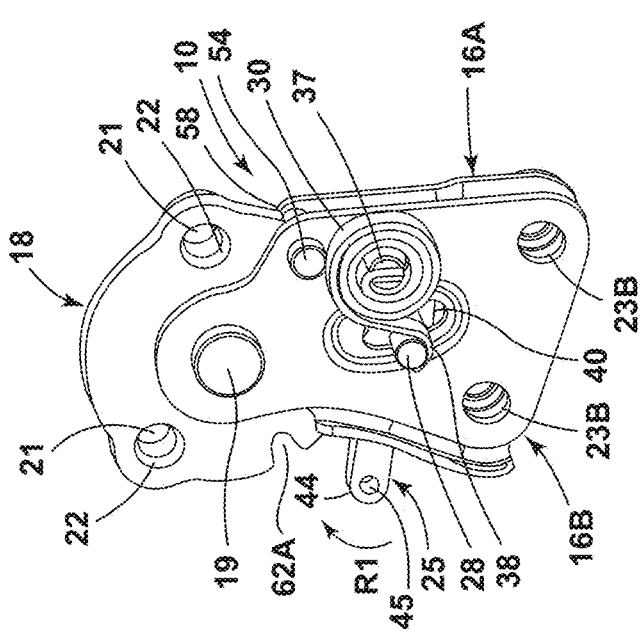
FIG. 3 is a perspective view of a first side of a motion control mechanism for the steering wheel assembly of FIG. 1.
Figure 5:
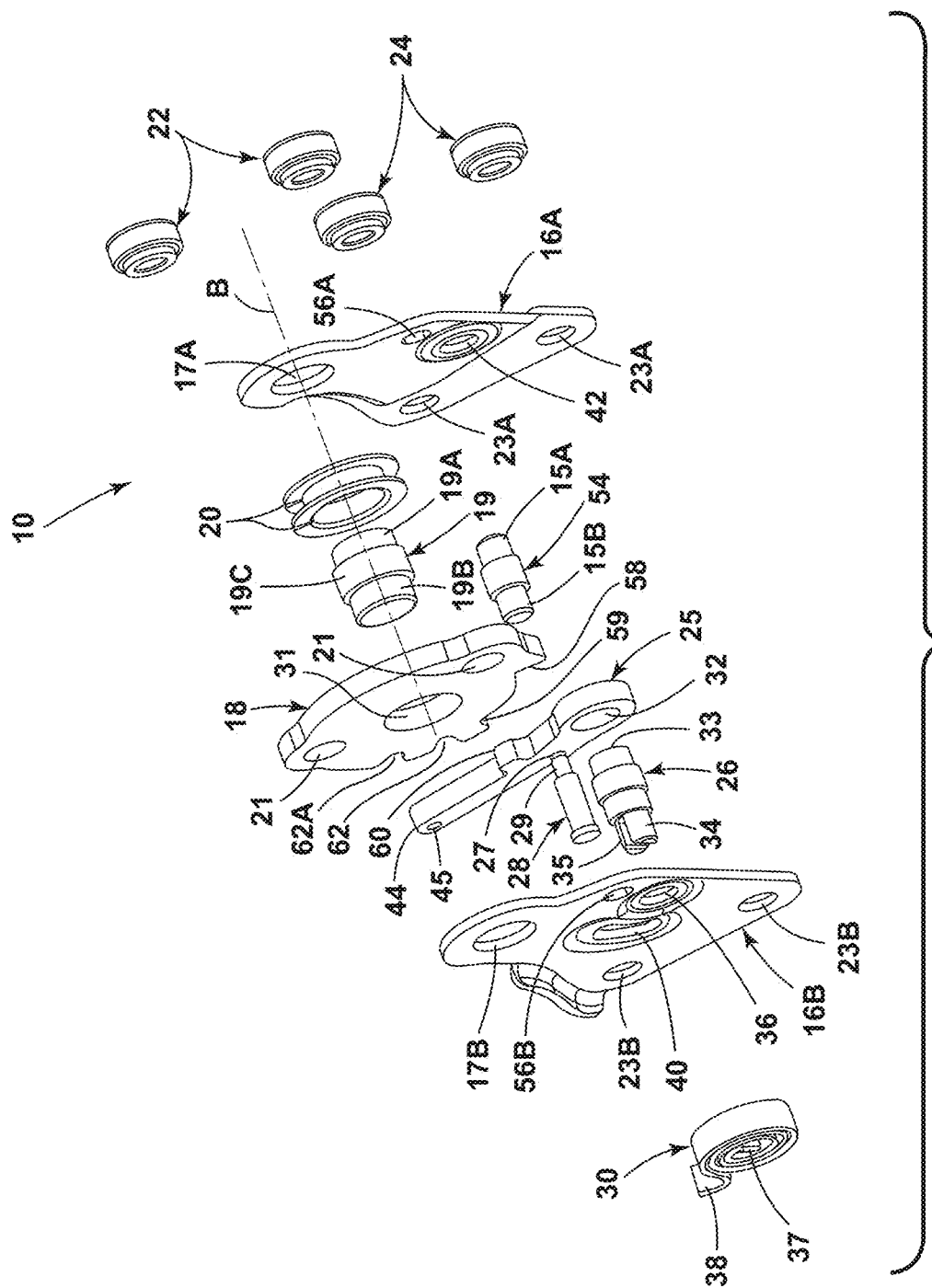
FIG. 5 is an exploded perspective view of the mechanism of FIGS. 3 and 4.

With further reference to FIGS. 3-5, a motion control mechanism 10 includes a cam 25 that selectively engages a lock sector 18 to control movement of rim structure 4 relative to base structure 2. As discussed in more detail below, cam 25 includes a protrusion 60 that selectively engages one or more detent notches 62, 62A of lock sector 18 to provide a detent, and protrusion 60 also engages a lock surface 59 of lock sector 18 to retain lock sector 18 in a driving position when rim structure 4 is in the driving position. Mechanism 10 includes an inner cover plate 16A, an outer cover plate 16B. Lock sector 18 is pivotably mounted to the cover plates 16A and 16B by a main pivot 19 and bushings 20 for rotation about second axis "B." The mechanism 10 of FIGS. 3-5 may comprise a right hand mechanism 10B (FIG. 2). It will be understood that the left hand mechanism 10A is a mirror image of the mechanism 10 of FIGS. 3-5. Main pivot 19 includes a first end 19A (FIG. 5) that is received in an opening 17A of plate 16A, and a second end 19B that is received in an opening 17B of outer cover plate 16B. Main pivot 19 includes a central portion 19C that rotatably engages opening 31 of lock sector 18 to thereby rotatably support the lock sector 18. The lock sector 18 may include openings 21 that receive cinch nuts 22 to secure the lock sector to bridge structure 15 of rim structure 4 such that lock sector 18 rotates with rim structure 4. Cover plates 16A and 16B may include openings 23A and 23B, respectively, that receive cinch nuts 24 to thereby secure the cover plates 16A and 16B to the base structure 2, and in particular to bracket 12 (FIG. 2) of base structure 2.

Cam 25 includes an opening 32 that receives a cam pivot 26 to rotatably interconnect cam 25 with cover plates 16A and 16B. End 34 of cam pivot 26 is received in opening 36 of outer cover plate 16B. End 34 of cam pivot 26 includes a slot 35 that receives an inner end 37 of a torsion spring 30. When assembled, outer end 38 of torsion spring 30 engages cam pin 28 to rotationally bias cam 25. Inner end 29 of cam pin 28 is received in an opening 27 of cam 25, and cam pin 28 extends through an arcuate slot 40 in outer cover plate 16B. End 33 of cam pivot 26 may be fixedly received in an opening 42 of inner cover plate 16A to prevent rotation of cam pivot 26 to thereby prevent rotation of inner end 37 of spring 30. Spring 30 therefore biases cam 25 into engagement with lock sector 18 as shown by the arrows "R1" in FIGS. 3 and 4.

Cam 25 includes an outer end 44 having an opening 45 that connects cam 25 to a linkage 46. Linkage 46 may comprise a cable, a rigid link or the like. Linkage 46 is operably connected to a powered actuator 48 (shown schematically in FIG. 4), and the powered actuator 48 may be operably connected to a controller 50. Controller 50 may comprise virtually any suitable controller (e.g., an existing vehicle controller). Powered actuator 48 is configured to generate a force "T1" acting on cam 25 when powered actuator 48 is actuated. As shown in FIG. 4, force "T1" acts on cam 25 in a rotational direction that is opposite to rotational bias R1 of spring 30. A user input feature such as a button 52 (FIG. 2) may be utilized to generate an unlock request to controller 50 whereby the controller 50 unlocks the motion control mechanism 10 unless predefined "deny unlock" criteria are present. Button 52 may be positioned on the steering wheel assembly 1 as shown in FIG. 2, or the button 52 may be positioned elsewhere as required for a particular application. If the vehicle is in park, or in an autonomous operating mode (e.g., if steering wheel assembly 1 is in a vehicle having an autonomous control mode), the controller 50 generates a signal to powered actuator 48 whereby the powered actuator 48 shifts the cam 25 due to force T1 to rotate the cam 25 in a direction opposite the arrow "R1." Rotation of the cam 25 due to actuation of powered actuator 48 thereby overcomes the bias of spring 30 and disengages cam 25 from lock sector 18.

A lock stop pin 54 includes opposite ends 15A and 15B that are received in openings 56A and 56B, respectively, of cover plates 16A and 16B. As discussed in more detail below, stop surface 58 of lock sector 18 engages lock stop pin 54 to limit rotation of lock sector 18 due to bias of spring 30.

Figure 6:
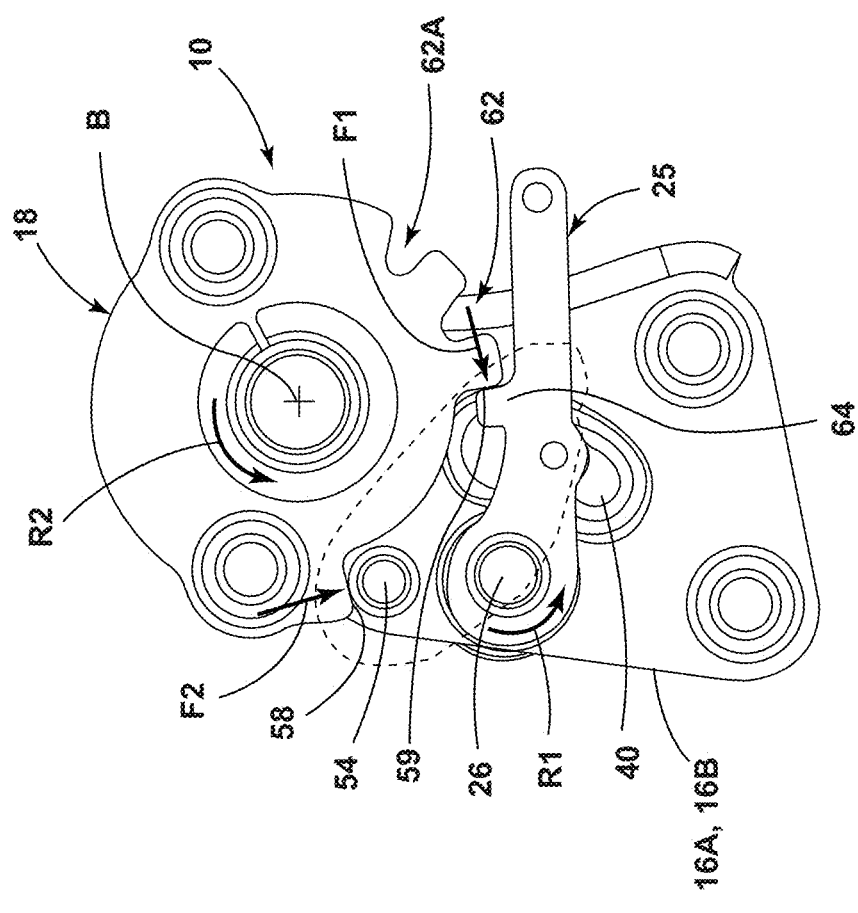
FIG. 6 is an elevational view of the mechanism of FIG. 4 in a locked configuration.

With further reference to FIG. 6, when rim structure 4 is in a driving position, motion control mechanism 10 (e.g., mechanisms 10A, 10B) may be in a locked configuration to prevent movement of rim structure 4 relative to base structure 2. Specifically, when motion control mechanism 10 is in a locked configuration, cam 25 is in a locked position and stop surface 58 of lock sector 18 engages lock stop pin 54 due to rotational bias "R2", and surface 64 of cam 25 simultaneously engages lock surface 59 of lock sector 18. Rotation bias "R2" results from contact between side surface 64 of protrusion 60 of cam 25 and lock surface 59 of lock sector 18. In particular, torsional bias "R1" acting on cam 25 due to spring 30 provides sliding contact between lock surface 59 and surface 64 of cam 25, thereby tending to rotate lock sector 18 in the direction of the arrow "R2." The interaction of surfaces 59 and 64 generates a force "F1" acting on lock sector 18, and lock sector 18 generates a force "F2" acting on lock stop pin 54. Because the forces "F1" and "F2" act in opposite directions, the lock sector 18 is tightly wedged in the locked position to prevent movement of rim structure 4 from the driving position, and to prevent free play (looseness) that might otherwise be perceptible to a user.

Figure 8:
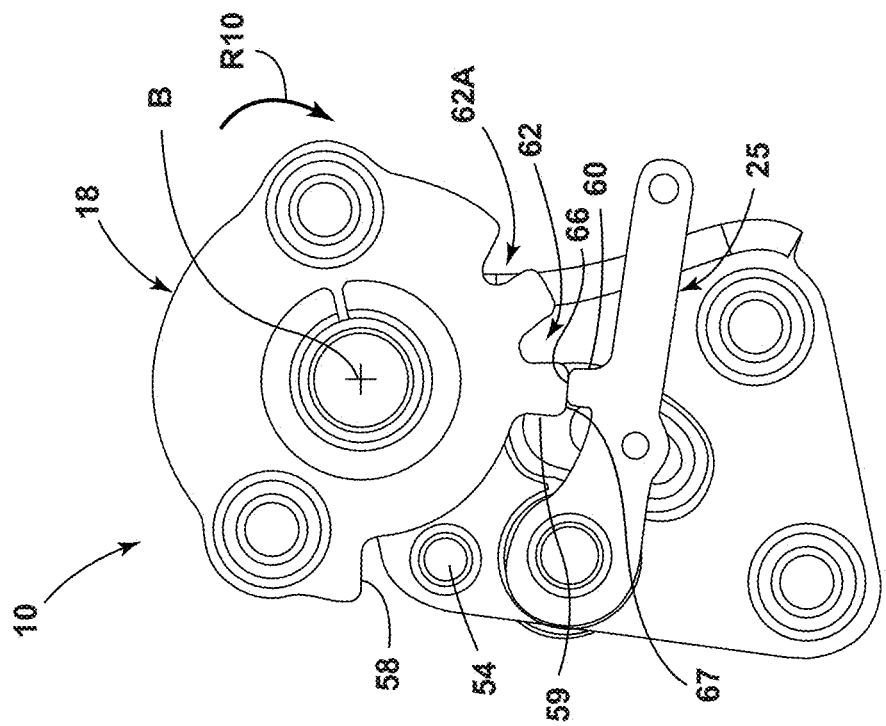
FIG. 8 shows the mechanism of FIG. 7 in an unlocked configuration that occurs when the rim structure is moved away from a driving position.
Figure 7:
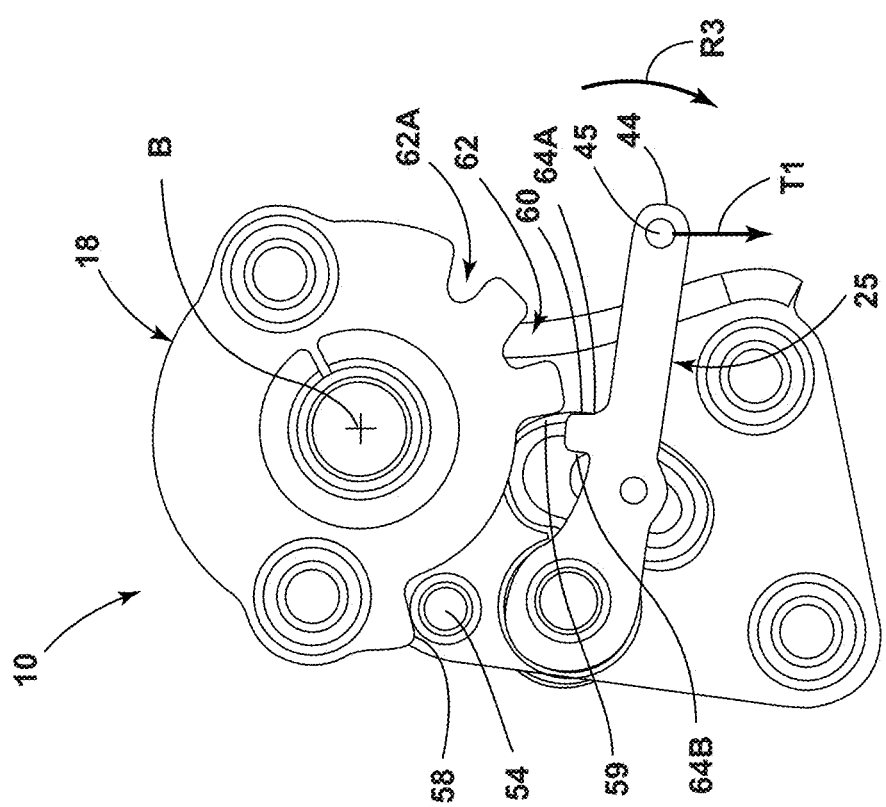
FIG. 7 shows the mechanism of FIG. 6 in an unlocked configuration.

With further reference to FIGS. 7 and 8, if a user desires to move the steering wheel rim structure 4 from the driving position 4A (FIG. 1) to a utility position 4B or 4C, a user actuates the button 52, and controller 50 then actuates powered actuator 48 (FIG. 4) to generate a force "T1" that rotates cam 25 in a direction "R3" that is opposite the bias of spring 30 from a locked position (FIG. 6) to an unlocked position (FIGS. 7 and 8). Cam 25 may be disengaged from lock surface 59 of lock sector 18. Controller 50 may be configured to deny an unlock request if the vehicle is not in park and/or if other predefined "deny unlock" criteria are present. For example, if the steering wheel assembly 1 is in an autonomous vehicle having an autonomous operating mode, controller 50 may be configured to permit unlocking if the vehicle is not in park, but only when the vehicle is in an autonomous operating mode. Thus, the controller 50 may be configured to actuate powered actuator 48 upon receiving an unlock request unless predefined "deny unlock" operating conditions or criteria are present.

After the cam 25 is shifted to an unlocked position or configuration as shown in FIG. 7, a user can apply a force "F10" (FIG. 1) to rim structure 4 to thereby rotate rim structure 4 in a first direction "R10" from a driving position 4A to a utility position 4B, 4C, etc. Referring again to FIG. 8, as the rim structure 4 and lock sector 18 rotate, an end surface 66 of protrusion 60 of cam 25 may slidably engage a surface 67 of lock sector 18 due to bias of spring 30.

Figure 9:
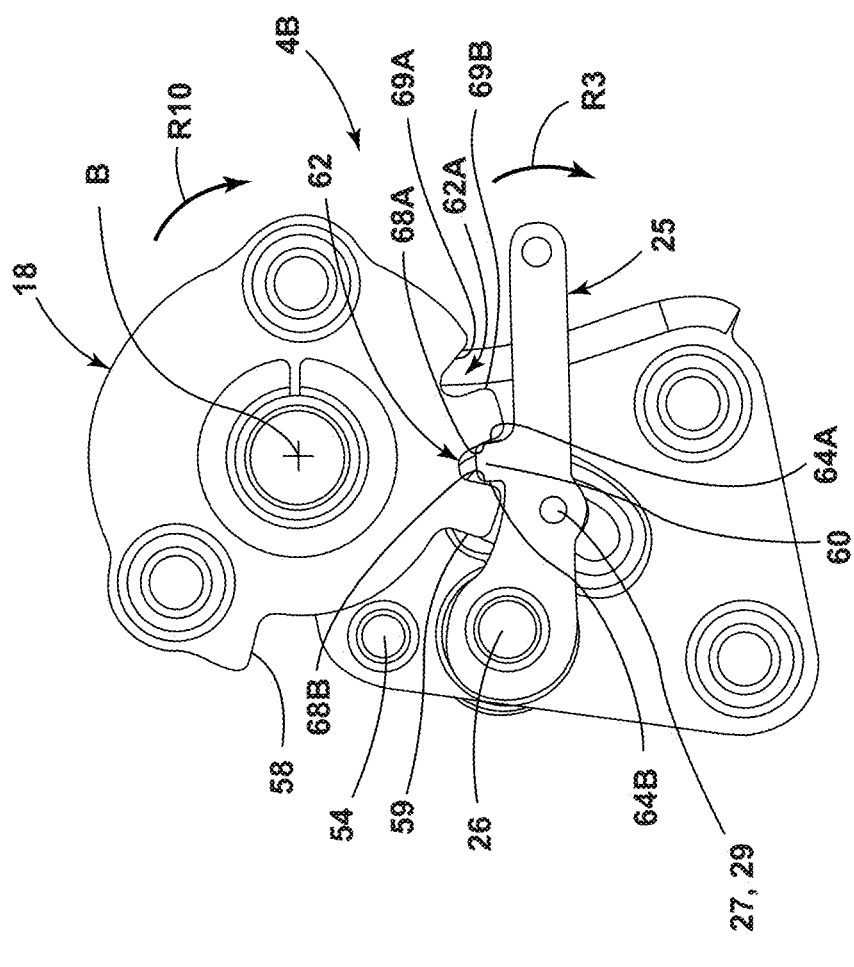
FIG. 9 shows the mechanism of FIG. 8 in a first detent position or configuration.

With further reference to FIG. 9, when rim structure 4 is in a first utility position 4B, protrusion 60 of cam 25 is received in a first detent notch 62 of lock sector 18. The detent notch 62 may include first and second opposed side or edge detent surfaces 68A and 68B, respectively, which engage first and second side surfaces 64A and 64B of protrusion 60, respectively. The opposed detent surfaces 68A and 68B may extend outwardly away from each other such that detent notch 62 is generally V-shaped. If a force is applied to rim structure 4 in a first direction "R10," sliding contact between surfaces 64A and 68A will generate a force tending rotate cam 25 in a direction "R3." If a user applies a force tending to rotate the rim structure 4 in a second direction that is opposite the first direction "R10," sliding contact between surfaces 64B and 68B will again generate a force tending to rotate cam 25 in a direction of arrow "R3." Thus, the engagement of protrusion 60 in detent notch 62 provides a retaining detent force that tends to retain the rim structure 4 in first utility position 4B (FIG. 1). However, a user can apply a force to the rim structure 4 that is sufficient to cause cam 25 to disengage from the detent notch 62, thereby permitting rotation of rim structure 4 relative to base structure 2.

Figure 11:
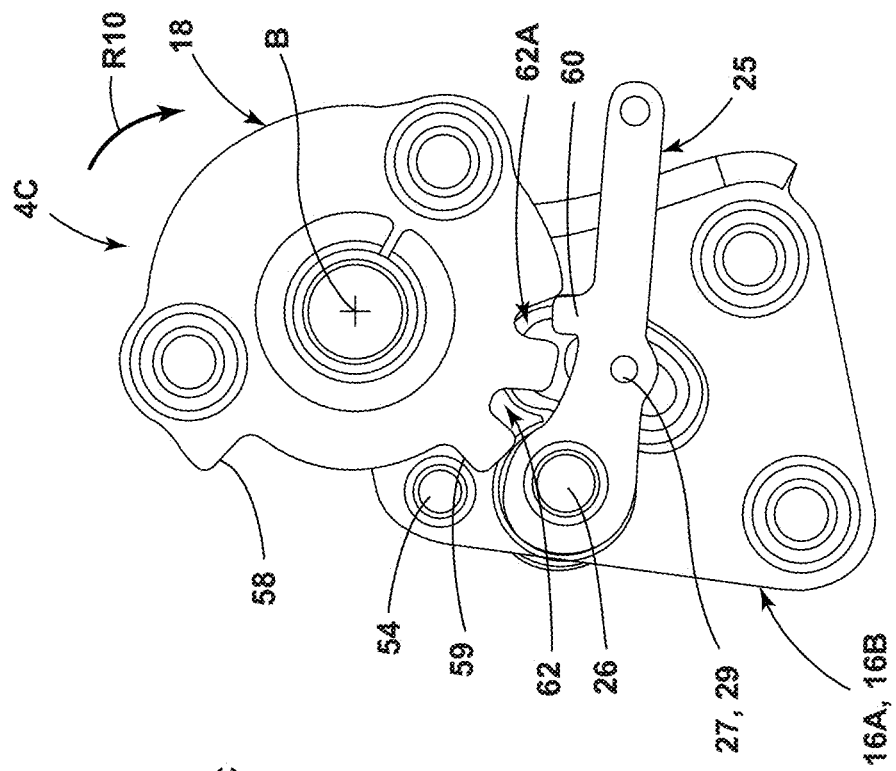
FIG. 11 shows the mechanism in an over-travel position or configuration.
Figure 10:
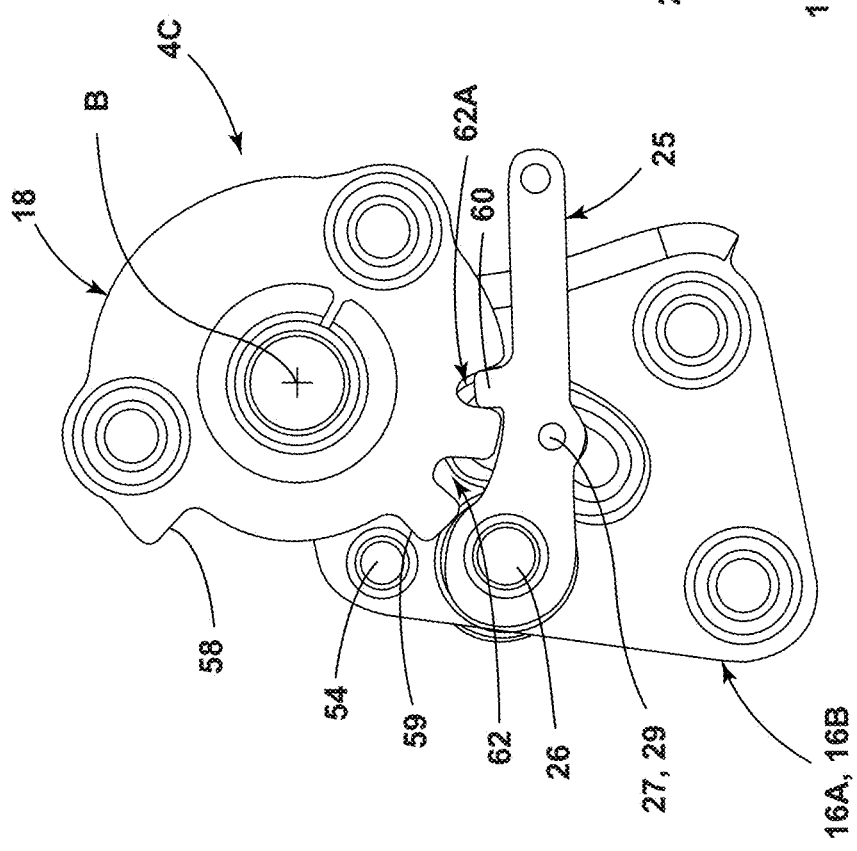
FIG. 10 shows the mechanism of FIG. 8 in a second detent position or configuration.

A second detent notch 62A (FIG. 9) corresponds to second utility position 4C. Rim 4 is generally horizontal when in "table top" utility position 4C. One or both opposed edge detent surfaces 69A and 69B of second notch 62A may be tapered whereby a torsional force (e.g., R10) acting on lock sector 18 will generate a force tending to rotate cam 25 in the direction of arrow R3. When protrusion 60 of cam 25 is in engagement with second detent notch 62A, a user can apply a force sufficient to cause rotation of cam 25 out of engagement with detent notch 62A to thereby permit rotation of rim structure 4 in a second direction away from second utility position 4C back toward the driving position 4A. However, with further reference to FIG. 11, if a user applies a force to the rim structure 4 when the rim structure 4 is in the second utility position 4C in an effort to rotate the rim structure 4 in a first direction beyond the position 4C, lock surface 59 of lock sector 18 engages lock stop pin 54. This prevents rotation of rim structure 4 in the first direction beyond the second utility position 4C. Alternatively, edge 69A may be configured without a taper such that contact between protrusion 60 and edge 69A does not generate a force tending to rotate cam 25 to disengage protrusion 60 from second notch 62A.

In the examples discussed above, the rim structure 4 may be moved to first and second utility positions 4B and 4C, respectively. However, it will be understood that the steering wheel assembly 1 may be configured to provide additional utility positions. Alternatively, the steering wheel assembly 1 may be configured to provide only a single utility position (e.g., utility position 4C; FIG. 1) in addition to the driving position 4A. Also, it will be understood that the present disclosure is not limited to the motion control mechanism 10 described above, and other suitable mechanisms may be utilized to lock rim structure 4 in a driving position 4A, and to provide a detent in one or more utility positions that can be overcome by a user applying a force to the rim structure 4.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A steering wheel assembly for a vehicle, the steering wheel assembly comprising:
a base structure that is pivotable about a first axis to provide a steering input;
a rim structure connected to the base structure by a bridging structure, the rim structure includes a first portion disposed on a first side of the base structure and a second portion disposed on a second side of the base structure, wherein a transition from the first portion of the rim structure to the second portion of the rim structure crosses the bridging structure;
the rim structure is rotatably connected to the base structure to permit rotation of the rim structure relative to the base structure about a second axis that is transverse to the first axis, whereby the rim structure can be rotated relative to the base structure between a driving position and a utility position, and wherein the rim structure and the base structure are configured to rotate together about the first axis when the rim structure is in the driving position, and wherein the rim structure rotates in a first direction relative to the base structure about the second axis when moving from the driving position to the utility position, and rotates in a second direction relative to the base structure about the second axis when moving from the utility position to the driving position, wherein when the rim structure rotates about the second axis the first and second portions rotate simultaneously in either the first direction or second direction;
a powered lock configured to lock the rim structure in the driving position relative to the base structure when the lock is in a locked configuration, and wherein the powered lock shifts to an unlocked configuration permitting rotation of the rim structure relative to the base structure about the second axis when the powered lock is actuated; and
a detent mechanism configured to retain the rim structure in the utility position relative to the base structure, wherein the detent mechanism is configured to release and permit rotation of the rim structure about the second axis relative to the base structure when a user applies a force to the rim structure sufficient to overcome a predefined retaining force of the detent mechanism.

2. The steering wheel assembly of claim 1, wherein:
the rim structure comprises a continuous loop defining a plane; and
the plane of the rim structure is substantially horizontal when the rim structure is in the utility position.

3. The steering wheel assembly of claim 1, wherein:
the utility position comprises a first utility position; and
the detent mechanism is configured to retain the rim structure in a second utility position between the first utility position and the driving position.

4. The steering wheel assembly of claim 1, wherein:
the utility position comprises a first utility position; and
the detent mechanism is configured to retain the rim structure in a plurality of intermediate utility positions between the first utility position and the driving position.

5. The steering wheel assembly of claim 1, including:
a user input feature configured to permit a user to generate an unlock request; and
a controller operably connected to the user input feature and the powered lock, wherein the controller is configured to unlock the powered lock in response to an unlock request unless predefined deny unlock criteria are satisfied.

6. The steering wheel assembly of claim 5, wherein:
the predefined deny unlock criteria includes at least one of the vehicle not being in park or not being in an autonomous control mode.

7. A steering wheel assembly, comprising:
a base structure that is pivotable about a first axis to provide a steering input;
a rim structure that is rotatably connected to the base structure to permit rotation of the rim structure relative to the base structure about a second axis that is transverse to the first axis, whereby the rim structure can be rotated relative to the base structure between a driving position and a utility position, and wherein the rim structure and the base structure are configured to rotate together about the first axis when the rim structure is in the driving position, and wherein the rim structure rotates in a first direction relative to the base structure about the second axis when moving from the driving position to the utility position, and rotates in a second direction relative to the base structure about the second axis when moving from the utility position to the driving position;
the rim structure includes a lock sector having a lock surface and a detent surface;
a cam configured to selectively engage the lock surface when the rim structure is in the driving position to prevent movement of the rim structure relative to the base structure in at least the first direction, and wherein the cam is configured to selectively engage the detent surface when the rim structure is in the utility position;
the cam is rotatably mounted to the base structure; and
a powered actuator configured to selectively rotate the cam from a locked position in which the cam engages the lock surface to an unlocked position in which the cam is disengaged from the lock surface to permit rotation of the rim structure relative to the base structure.

8. The steering wheel assembly of claim 7, including:
a spring rotatably biasing the cam into engagement with the lock sector, and wherein:
the lock sector further includes a first stop surface that is configured to engage a second stop surface of the base structure when the rim structure is in the driving position to prevent rotation of the rim structure in the second direction beyond the driving position.

9. The steering wheel assembly of claim 8, wherein:
the cam includes a cam surface that is configured to engage the lock surface of the lock sector when the cam is in the locked position and the rim structure is in the driving position to generate a force tending to rotate the rim structure in the second direction, and wherein the first stop surface of the lock sector is configured to simultaneously engage the second lock surface when the rim structure is in the driving position to prevent rotation of the rim structure in the second direction.

10. The steering wheel assembly of claim 9, wherein:
the cam surface is configured to slidably engage the detent surface of the lock sector when the rim structure is in the utility position, and wherein the engagement of the cam surface and the detent surface results in a force on the cam tending to disengage the cam surface from the detent surface when a force is applied to the rim structure to rotate the rim structure about the second axis relative to the base structure.

11. The steering wheel assembly of claim 10, wherein:
the lock sector includes a notch having first and second opposed detent surfaces; and
the cam surface comprises a protrusion that is received in the notch.

12. The steering wheel assembly of claim 11, wherein:
the protrusion slides along the first detent surface when a force is applied to the rim structure to rotate the rim structure in the first direction, and the protrusion slides along the second detent surface when a force is applied to the rim structure to rotate the rim structure in the second direction.

13. The steering wheel assembly of claim 12, wherein:
the lock sector includes a third lock surface that is configured to engage the base structure when the rim structure is in the utility position to prevent rotation of the rim structure in the first direction beyond the utility position, and wherein the protrusion of the cam simultaneously engages the first detent surface while the third lock surface engages the base structure.

14. The steering wheel assembly of claim 13, wherein:
the rim structure comprises a ring configured to be grasped by a user and first and second bridging structures extending between the ring and the base structure, wherein the bridging structures comprise first and second lock sectors, each having first and second opposed detent surfaces; and
the steering wheel assembly includes first and second cams rotatably biased into engagement with the first and second lock sectors, respectively, by first and second springs, respectively.

15. A steering wheel assembly for a vehicle, the steering wheel assembly comprising:
a rim structure movably connected to a base structure for movement between a driving position and a utility position, wherein the rim structure rotates in a first direction relative to the base structure when moving from the driving position to the utility position, and rotates in a second direction relative to the base structure when moving from the utility position to the driving position, a bridging structure extending between the rim structure and the base structure; and
a movement control mechanism configured to selectively lock the rim structure in the driving position relative to the base structure when the movement control mechanism is locked, whereby the rim structure cannot be moved relative to the base structure when the movement control mechanism is locked, and wherein the movement control mechanism includes a lock sector configured to retain the rim structure in the utility position relative to the base structure, whereby the lock sector is configured to permit a user to apply a force to the rim structure when the rim structure is in the utility position to overcome the lock sector and move the rim structure from the utility position to the driving position, and a cam configured to selectively engage the lock sector to prevent movement of the rim structure in the first direction relative to the base structure, wherein the cam and the lock sector are disposed between the rim structure and the base structure.

16. The steering wheel assembly of claim 15, wherein:
the movement control mechanism includes a powered actuator that can be actuated to unlock the movement control mechanism to permit movement of the rim structure relative to the base structure.

17. The steering wheel assembly of claim 16, wherein:
the lock sector further includes a detent surface; and
the cam is configured to engage the detent surface when the rim structure is in the utility position to retain the rim structure in the utility position to provide a predefined retaining force that can be overcome by applying a force to the rim structure, without actuating the powered actuator.

18. The steering wheel assembly of claim 17, wherein:
the lock sector is fixed to the rim structure and moves with the rim structure, wherein the detent surface comprises a notch in the lock sector; and
the cam is rotatably mounted to the base structure and includes a protrusion that is biased into engagement with the notch of the lock sector.

\* \* \* \* \*